(12) United States Patent
Shao et al.

(10) Patent No.: US 11,294,640 B2
(45) Date of Patent: Apr. 5, 2022

(54) RANDOM NUMBER GENERATOR

(71) Applicant: eMemory Technology Inc., Hsin-Chu (TW)

(72) Inventors: Chi-Yi Shao, Hsinchu County (TW); Meng-Yi Wu, Hsinchu County (TW); Chih-Ming Wang, Hsinchu County (TW)

(73) Assignee: EMEMORY TECHNOLOGY INC., Hsin-Chu (TW)

(*) Notice: Subject to any disclaimer, the term of this patent is extended or adjusted under 35 U.S.C. 154(b) by 231 days.

(21) Appl. No.: 16/784,739

(22) Filed: Feb. 7, 2020

(65) Prior Publication Data

US 2020/0293287 A1 Sep. 17, 2020

Related U.S. Application Data

(60) Provisional application No. 62/817,568, filed on Mar. 13, 2019, provisional application No. 62/847,246, filed on May 13, 2019.

(51) Int. Cl.
*G06F 7/58* (2006.01)
(52) U.S. Cl.
CPC .................................. *G06F 7/588* (2013.01)
(58) Field of Classification Search
CPC ..... G06F 7/58–588; H04L 9/065–0668; H04L 9/08; H04L 9/0816; H04L 9/0861; H04L 9/0869
USPC ................................................. 708/250–255
See application file for complete search history.

(56) References Cited

U.S. PATENT DOCUMENTS

| 9,613,714 | B1 | 4/2017 | Wong et al. | |
| 2016/0170711 | A1 | 6/2016 | Alon | |
| 2016/0204781 | A1* | 7/2016 | Plusquellic | H03K 19/215 326/8 |
| 2018/0131527 | A1 | 5/2018 | Lu et al. | |

FOREIGN PATENT DOCUMENTS

EP 3512157 A1 * 7/2019 ........... H04L 9/0894

OTHER PUBLICATIONS

Search report issued by EPO dated Jul. 28, 2020.
Mehrdad Majzoobil et al., "FPGA-Based True Random Number Generation Using Circuit Metastability with Adaptive Feedback Control", (Sep. 28, 2011), pp. 17-32, 2011, International Association for Cryptologic Research 2011.

* cited by examiner

*Primary Examiner* — Emily E Larocque
(74) *Attorney, Agent, or Firm* — WPAT, PC (57) ABSTRACT

A random number generator includes a counting value generator, an address generator, a static entropy source and a processing circuit. The counting value generator generates a first random number. The address generator generates an address signal. The static entropy source is connected with the address generator to receive the address signal and generates a second random number. The processing circuit is connected with the static entropy source and the counting value generator to receive the first random number and the second random number. After the first random number and the second random number are processed by the processing circuit, the processing circuit generates an output random number.

20 Claims, 8 Drawing Sheets

RANDOM NUMBER GENERATOR

This application claims the benefit of U.S. provisional application Ser. No. 62/817,568, filed Mar. 13, 2019, and U.S. provisional application Ser. No. 62/847,246, filed May 13, 2019, the subject matters of which are incorporated herein by reference.

FIELD OF THE INVENTION

The present invention relates to a random number generator (RNG), and more particularly to a random number generator using a physically unclonable function (PUF) technology.

BACKGROUND OF THE INVENTION

Figure 1A:
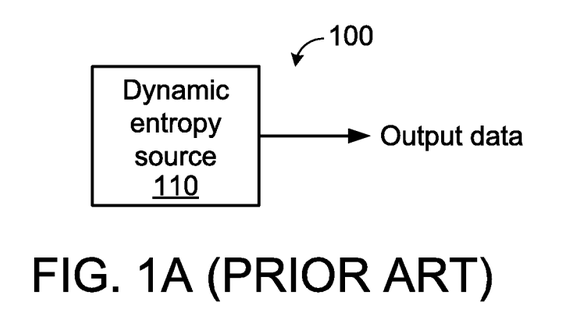
FIG. 1A (prior art) is a schematic functional block diagram illustrating a conventional random number generator.

FIG. 1A is a schematic functional block diagram illustrating a conventional random number generator. The random number generator 100 comprises a dynamic entropy source 110. The dynamic entropy source 110 generates an unpredictable output data as a random number.

The dynamic entropy source 110 generates the random number according to its uncertainty. That is to say, the dynamic entropy source 110 generates a series of unpredictable logical values "0" and "1" as the random numbers.

Generally, the randomness of the output data from the random number generator 100 of FIG. 1A depends on the quality of the dynamic entropy source 110. If the quality of the dynamic entropy source 110 is not good, the dynamic entropy source 110 generates the output data with bad randomness.

Figure 1B:
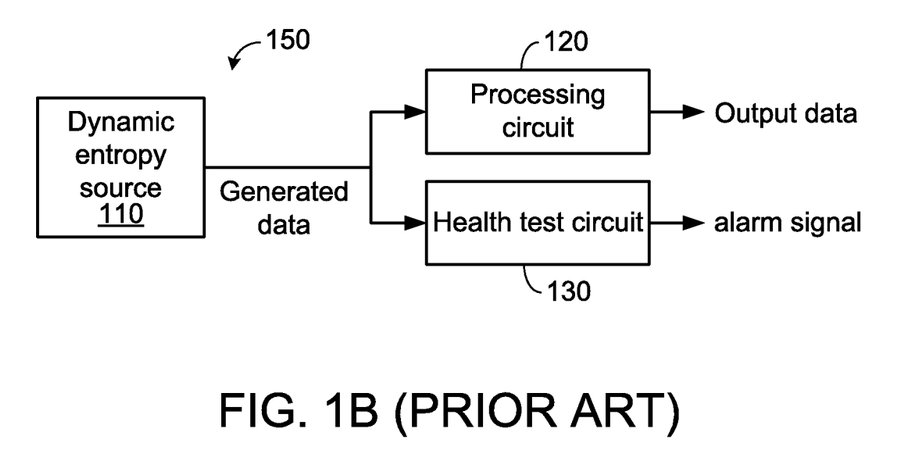
FIG. 1B (prior art) is a schematic functional block diagram illustrating another conventional random number generator.

For improving the randomness of the output data, another random number generator as shown in FIG. 1B is provided. As shown in FIG. 1B, the random number generator 150 comprises a dynamic entropy source 110, a processing circuit 120 and a health test circuit 130.

The dynamic entropy source 110 issues a generated data to the processing circuit 120. After the generated data is processed by the processing circuit 120, an output data is generated as a random number. Generally, the processing circuit 120 performs a specified algorithm on the generated data, and generates the output data with good randomness as the random number. For example, the processing circuit 120 is a secure hash algorithm (SHA) circuit or an advanced encryption standard (AES) circuit. Since the generated data is processed by the processing circuit 120, the random number generator 150 generates the output data with the better randomness.

The health test circuit 130 receives the generated data from the dynamic entropy source 110 and evaluating the generated data. If the health test circuit 130 judges that the randomness of the generated data is bad, the health test circuit 130 generates an alarm signal. For example, if the number of the consecutive logical values "1" in the generated data is too high, the health test circuit 130 generates the alarm signal. Alternatively, if the identical pattern continuously appears in the generated data, the health test circuit 130 also generates the alarm signal.

As mentioned above, the random number generator 100 of FIG. 1A and the random number generator 150 of FIG. 1B use the dynamic entropy sources 110 to generate the random number. Consequently, the random number generators are referred as true random number generators (TRNG).

As known, a physically unclonable function (PUF) technology acquires the unique random number of the semiconductor chip according to the manufacturing variation of the semiconductor chip. That is, even if the PUF semiconductor chip is produced by a precise manufacturing process, the random number cannot be duplicated. Consequently, the PUF semiconductor chip is suitably used in the applications with high security requirements.

Moreover, U.S. Pat. No. 9,613,714 disclosed a random number generator with antifuse transistor type memory cells. Due to the process variation of the antifuse transistor type memory cell, the storage state of the programmed OTP memory cell cannot be predicted after the antifuse transistor type memory cell is programmed. That is, the logical level stored in the antifuse transistor type memory cell is unpredictable. Consequently, antifuse transistor type memory cell is referred as a PUF memory cell. Moreover, the program action is also referred as enrollment.

Moreover, plural PUF memory cells may be constituted as a PUF cell array. After all of the PUF memory cells of the PUF cell array have been enrolled, specified logical levels are stored in the corresponding the PUF memory cells.

Since the logical level of each PUF memory cell is unpredictable, it is necessary to perform a read action on the PUF cell array to confirm the logical level of each antifuse transistor type memory cell. Consequently, the logical level of the antifuse transistor type memory cell is used as the random number. Generally, after the enrollment of the PUF cell array is completed, the logical levels stored in the PUF memory cells are unpredictable. However, since the logical levels stored in the PUF memory cells have been determined and cannot be changed, the random number generator with such characteristics may be referred as a pseudo random number generator (PRNG).

The present invention provides a true random number generator (TRNG) using the PUF cell array.

SUMMARY OF THE INVENTION

An embodiment of the present invention provides a random number generator. The random number generator includes a counting value generator, an address generator, a static entropy source and a processing circuit. The counting value generator generates a first random number. The address generator generates an address signal. The static entropy source is connected with the address generator to receive the address signal and generates a second random number. The processing circuit is connected with the static entropy source and the counting value generator to receive the first random number and the second random number. After the first random number and the second random number are processed by the processing circuit, the processing circuit generates an output random number.

Another embodiment of the present invention provides a random number generator. The random number generator includes a first dynamic entropy source, a second dynamic entropy source, a counting value generator, an address generator, a static entropy source, a processing circuit and a control circuit. The first dynamic entropy source generates a triggering signal. The second dynamic entropy source generates a first seed signal and a second seed signal. The counting value generator is connected with the second dynamic entropy source to receive the first seed signal and generate a first random number. The address generator is connected with the second dynamic entropy source to receive the second seed signal and generate an address signal. The static entropy source is connected with the address generator to receive the address signal and generate a second random number. The processing circuit is connected with the static entropy source and the counting value generator to receive the first random number and the second random number. After the first random number and the second random number are processed by the processing circuit, the processing circuit generates an output random number. The control circuit is connected with the first dynamic entropy source to receive the triggering signal. When the triggering signal is activated, the control circuit selectively generates a first reseed signal to the counting value generator.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
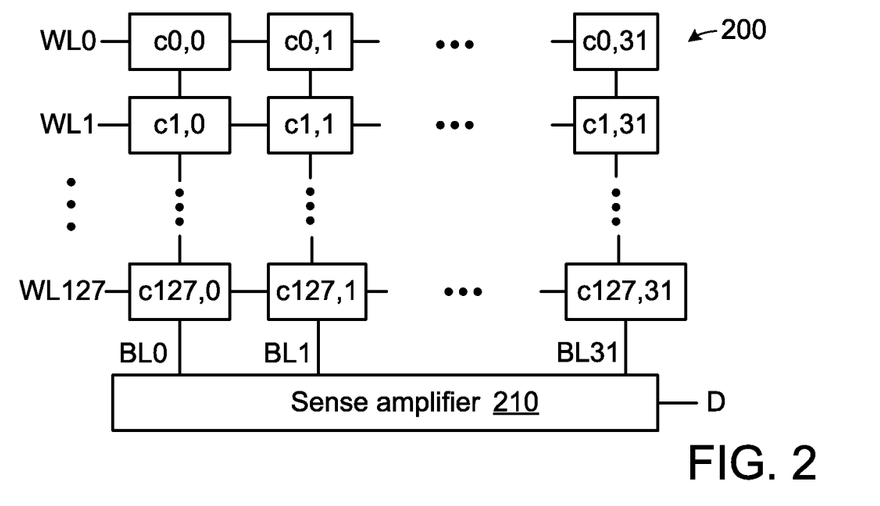
FIG. 2 is a schematic circuit block diagram illustrating the architecture of a static entropy source used in the random number generator of the present invention.

The present invention provides a random number generator. In the random number generator, a PUF cell array with plural PUF memory cells is used as a static entropy source. FIG. 2 is a schematic circuit block diagram illustrating the architecture of a static entropy source used in the random number generator of the present invention. The static entropy source is a PUF cell array 200. The PUF cell array 200 comprises 128×32 PUF memory cells $c0,0$~$c127,31$ for storing 4 k random bits.

After the enrollment on the PUF memory cells $c0,0$~$c127,31$ of the PUF cell array 200 is completed, a specified logical level is stored in each of the PUF memory cells $c0,0$~$c127,31$ as a random bit. Since the logical level in each of the PUF memory cells $c0,0$~$c127,31$ is unpredictable, it is necessary to perform a read action on the PUF memory cells $c0,0$~$c127,31$ of the PUF cell array 200 to confirm the logical level of each PUF memory cell. Consequently, the logical level of each PUF memory cell is used as the random bit.

Moreover, the PUF cell array 200 comprises 128 ($=2^7$) word lines WL0~WL127. Each word line is connected with 32 PUF memory cells. For example, the word line WL0 is connected with the 32 PUF memory cells $c0,0$~$c0,31$. That is, the PUF memory cells connected with each word line store 32 random bits.

If the PUF cell array 200 receives an address signal "0", the word line WL0 is activated. Consequently, the random bits in the 32 PUF memory cells $c0,0$~$c0,31$ corresponding to the word line WL0 are transmitted to a sense amplifier 210 through corresponding bit lines BL0~BL31, and a 32-bit random number D is outputted from the sense amplifier 210. Similarly, if the PUF cell array 200 receives an address signal "127", the word line WL127 is activated. Consequently, the random bits in the 32 PUF memory cells $c127,0$~$c127,31$ corresponding to the word line WL0 are transmitted to a sense amplifier 210 through corresponding bit lines BL0~BL31, and a 32-bit random number D is outputted from the sense amplifier 210.

Figure 3:
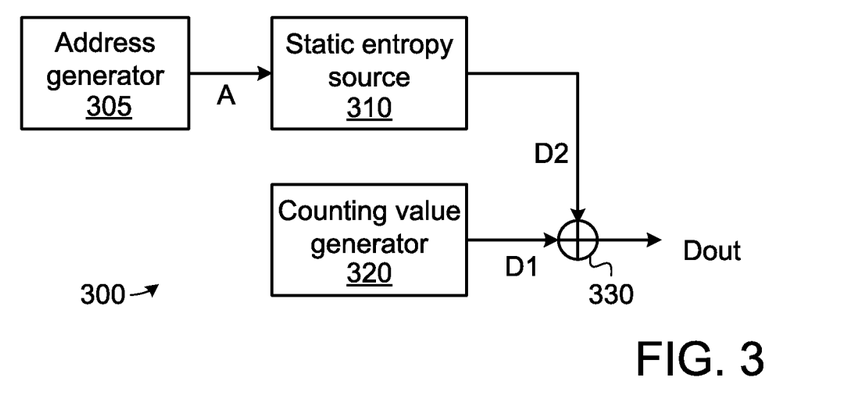
FIG. 3 is a schematic circuit block diagram illustrating the architecture of a random number generator according to a first embodiment of the present invention.

FIG. 3 is a schematic circuit block diagram illustrating the architecture of a random number generator according to a first embodiment of the present invention. As shown in FIG. 3, the random number generator 300 comprises an address generator 305, a static entropy source 310, a counting value generator 320 and a processing circuit 330. After an enrollment on the PUF cell array is completed, the PUF cell array is used as the static entropy source 310.

In this embodiment, the counting value generator 320 generates a first random number D1 to the processing circuit 330. The static entropy source 310 is connected with the address generator 305. According to an address signal A from the address generator 305, the static entropy source 310 generates a second random number D2 to the processing circuit 330. After the second random number D2 and the first random number D1 are processed by the processing circuit 330, the processing circuit 330 generates an output random number Dout. In such way, the output random number Dout generated by the random number generator 300 has good randomness.

For example, the static entropy source 310 generates a 32-bit second random number D2, and the counting value generator 320 generates a 32-bit first random number D1. After the processing circuit 330 performs a logical operation on the second random number D2 and the first random number D1, a 32-bit output random number Dout is outputted.

In an embodiment, the logical operation is an exclusive or operation (XOR operation). That is, after the XOR operation is performed on the most significant bit (MSB) of the second random number D2 and the most significant bit of the first random number D1, the most significant bit of the output random number Dout is generated. Similarly, after the XOR operation is performed on the least significant bit (LSB) of the second random number D2 and the least significant bit of the first random number D1, the least significant bit of the output random number Dout is generated. The rest may be deduced by analogy.

The counting value generator 320 is an ordinary counter or a linear feedback shift register (LFSR). The operating principle of the linear feedback shift register will be described as follows.

The linear feedback shift register comprises a shift register and a connection polynomial. After the connection polynomial is designed properly, plural statuses of the linear feedback shift register are circulated.

Figure 4A:
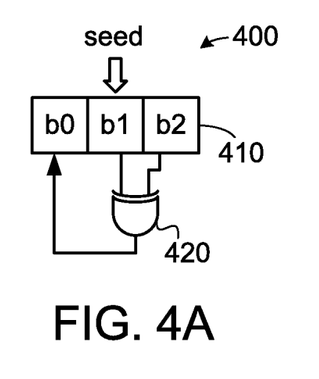
FIG. 4A schematically illustrates a 3-bit linear feedback shift register used in the random number generator of the present invention.
Figure 4B:
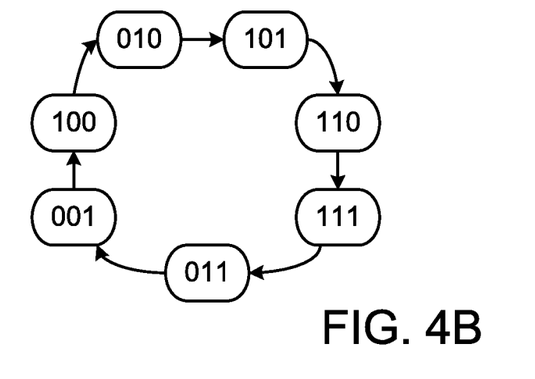
FIG. 4B schematically illustrates the operations of the 3-bit linear feedback shift register as shown in FIG. 4A.

FIG. 4A schematically illustrates a 3-bit linear feedback shift register used in the random number generator of the present invention. FIG. 4B schematically illustrates the operations of the 3-bit linear feedback shift register as shown in FIG. 4A. The linear feedback shift register 400 comprises a shift register 410 and an XOR gate 420. The bit "b2" and the bit "b1" of the shift register 410 are inputted into two input terminals of the XOR gate 420, respectively. An output terminal of the XOR gate 420 outputs the bit "b0" of the shift register 410. Consequently, the connection polynomial $g(x)$ may be expressed as: $g(x)=x^2+x^1+1$.

A seed signal "seed" is received by the shift register 410 and stored into the shift register 410. According to the connection polynomial $g(x)$, the shift register 410 achieves the purpose of circulating the plural statuses.

For example, the seed signal "seed" inputted into the shift register 410 is "101". Consequently, the initial status of the linear feedback shift register 400 is "101". As shown in FIG. 4B, the status of the linear feedback shift register 400 is changed from the initial status "101" to the statuses "110", "111", "011", "001", "100" and "010" sequentially. Then, the status of the linear feedback shift register 400 is changed to the status "101" again. The statuses as shown in FIG. 4B are circulated. That is, seven statuses of the linear feedback shift register 400 are circulated.

If the linear feedback shift register 400 receives the seed signal "011" when the linear feedback shift register 400 is in the "010" status, the status of the linear feedback shift register 400 is changed to "011" directly. Then, the status of the linear feedback shift register 400 is changed from the status "011" to the statuses "001", "100", "010", "101", "110" and "111" sequentially. In addition, the seven statuses of the linear feedback shift register 400 are circulated.

It is noted that the seed signal is not "000". That is, the linear feedback shift register 400 does not have the status "000". After the connection polynomial $g(x)$ is designed properly, the 7 ($=2^3-1$) statuses of the 3-bit linear feedback shift register 400 are circulated.

Similarly, in case that the linear feedback shift register is an n-bit linear feedback shift register, ($2^n-1$) statuses of the n-bit linear feedback shift register are circulated. For example, if n=7, the 127 ($=2^7-1$) statuses of the 7-bit linear feedback shift register are circulated. For example, if n=32, the ($2^{32}-1$) statuses of the 32-bit linear feedback shift register are circulated.

Alternatively, the counting value generator 320 and the address generator 305 may be implemented with linear feedback shift registers.

Figure 5:
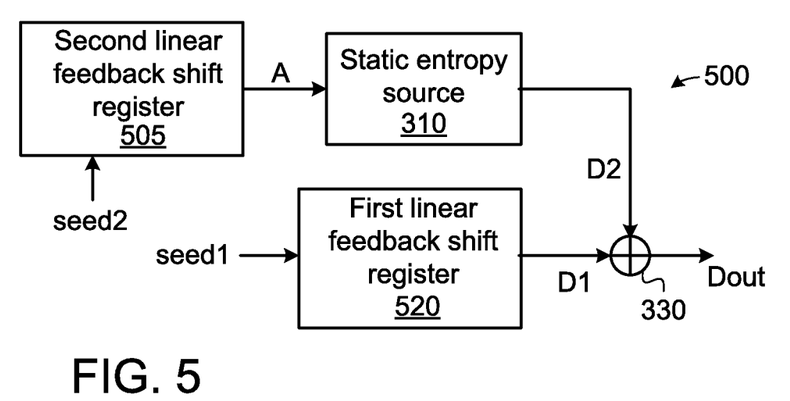
FIG. 5 is a schematic circuit block diagram illustrating the architecture of a random number generator according to a second embodiment of the present invention.

FIG. 5 is a schematic circuit block diagram illustrating the architecture of a random number generator according to a second embodiment of the present invention. As shown in FIG. 5, the random number generator 500 comprises a first linear feedback shift register 520, a static entropy source 310, a second linear feedback shift register 505 and a processing circuit 330. After an enrollment on the PUF cell array is completed, the PUF cell array is used as the static entropy source 310.

The status of the second linear feedback shift register 505 is used as an address signal A. The address signal A is inputted into the static entropy source 310. According to the address signal A, the static entropy source 310 generates a second random number D2 to the processing circuit 330. The status of the second linear feedback shift register 505 is used as a first random number D1. The first random number D1 is inputted into the processing circuit 330. After the second random number D2 and the first random number D1 are processed by the processing circuit 330, the processing circuit 330 generates an output random number Dout.

The static entropy source 310 is a PUF cell array. The PUF cell array comprises 128×32 PUF memory cells for storing 4k random bits. That is, the second linear feedback shift register 505 is a 7-bit linear feedback shift register that issues a 7-bit address signal A to the static entropy source 310. Consequently, the static entropy source 310 generates the 32-bit second random number D2. The first linear feedback shift register 520 is a 32-bit linear feedback shift register that generates a 32-bit first random number D1.

When the random number generator 500 is enabled, a first seed signal "seed1" is provided to the first linear feedback shift register 520, and a second seed signal "seed2" is provided to the second linear feedback shift register 505. Consequently, the ($2^{32}-1$) statuses of the first linear feedback shift register 520 are circulated, and the first linear feedback shift register 520 generates the second random number D2. Moreover, the 127 statuses of the second linear feedback shift register 505 are circulated, and the second linear feedback shift register 505 generates the address signal A.

When the random number generator 50 is in a previous status, the static entropy source 310 generates a 32-bit second random number D2 according to the address signal A and the first linear feedback shift register 520 generates a 32-bit first random number D1. After the processing circuit 330 performs a logical operation on the second random number D2 and the first random number D1, a 32-bit output random number Dout is outputted.

When the random number generator 50 is in another status, the static entropy source 310 generates another 32-bit second random number D2 according to the address signal A and the first linear feedback shift register 520 generates another 32-bit first random number D1. After the processing circuit 330 performs a logical operation on this second random number D2 and this first random number D1, another 32-bit output random number Dout is outputted The rest may be deduced by analogy. Whenever the status of the random number generator 500 is changed, the random number generator 500 generates a corresponding 32-bit output random number Dout. In comparison with the first embodiment, the output random number Dout generated by the random number generator 500 has better randomness.

In the random number generator 500 of the second embodiment, the plural statuses of the first linear feedback shift register 520 and the plural statuses of the second linear feedback shift register 505 are circulated in a fixed circulation manner. The random number generator of the second embodiment may be further modified. For example, a dynamic entropy source and a control circuit are employed to generate a reseed signal and load the reseed signal to the linear feedback shift register. Since the status of the linear feedback shift register is changed, the randomness of the output random number Dout generated by the random number generator is further enhanced.

Figure 6:
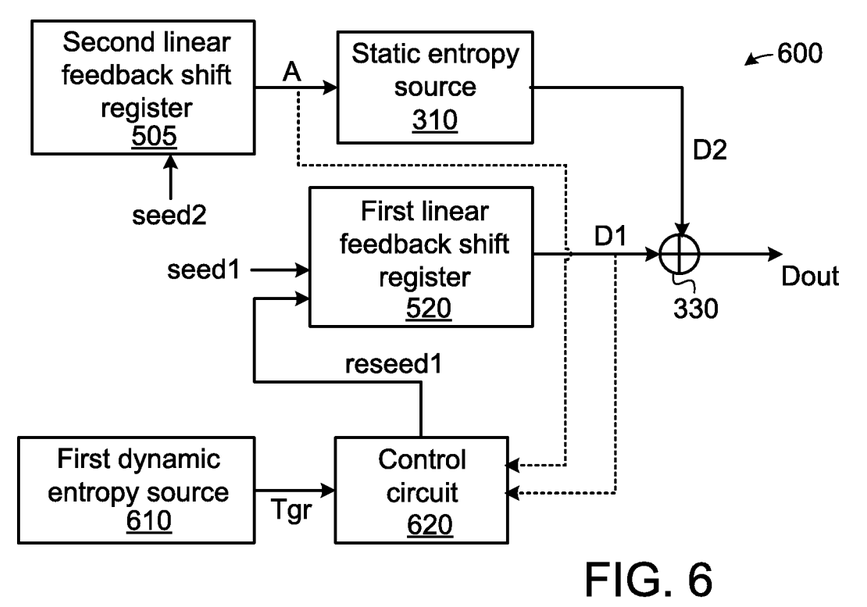
FIG. 6 is a schematic circuit block diagram illustrating the architecture of a random number generator according to a third embodiment of the present invention.

FIG. 6 is a schematic circuit block diagram illustrating the architecture of a random number generator according to a third embodiment of the present invention. As shown in FIG. 6, the random number generator 600 comprises a first linear feedback shift register 520, a static entropy source 310, a second linear feedback shift register 505, a processing circuit 330, a first dynamic entropy source 610 and a control circuit 620. The operations of the first linear feedback shift register 520, the static entropy source 310 and the second linear feedback shift register 505 are similar to those of the second embodiment, and are not redundantly described herein.

When the random number generator 600 is in a normal working state, the first dynamic entropy source 610 issues a triggering signal Tgr to the control circuit 620 randomly. For example, the first dynamic entropy source 610 issues a 1-bit triggering signal Tgr. When the triggering signal Tgr is in a high logical level state, the triggering signal Tgr is activated. When the triggering signal Tgr is in a low logical level state, the triggering signal Tgr is not activated.

According to the triggering signal Tgr, the control circuit 620 selectively generates a first reseed signal "reseed1" and loads the first reseed signal into the first linear feedback shift register 520. According to the first reseed signal, the status of the first linear feedback shift register 520 is updated and the circulating manner of the first linear feedback shift register 520 is changed. Moreover, in the next status, the first random number D1 is changed.

After the 32-bit first random number D1 and the 7-bit address signal A in the previous status are received by the control circuit 620, the 32-bit first random number D1 and the 7-bit address signal A are combined as a 32-bit first reseed signal "reseed1". When the triggering signal Tgr is activated, the control circuit 620 loads the first reseed signal into the first linear feedback shift register 520. Consequently, the status of the first linear feedback shift register 520 is updated, and the circulating manner of the first linear feedback shift register 520 is changed.

In the third embodiment, the control circuit 620 generates the first reseed signal "reseed1" to the first linear feedback shift register 520 only. It is noted that numerous modifications and alterations may be made while retaining the teachings of the invention. For example, in another embodiment, the control circuit 620 further generates a second reseed signal (not shown) to the second linear feedback shift register 505 in order to change the status of the second linear feedback shift register 505. Alternatively, the control circuit 620 generates the second reseed signal (not shown) to the second linear feedback shift register 505 only.

Figure 7A:
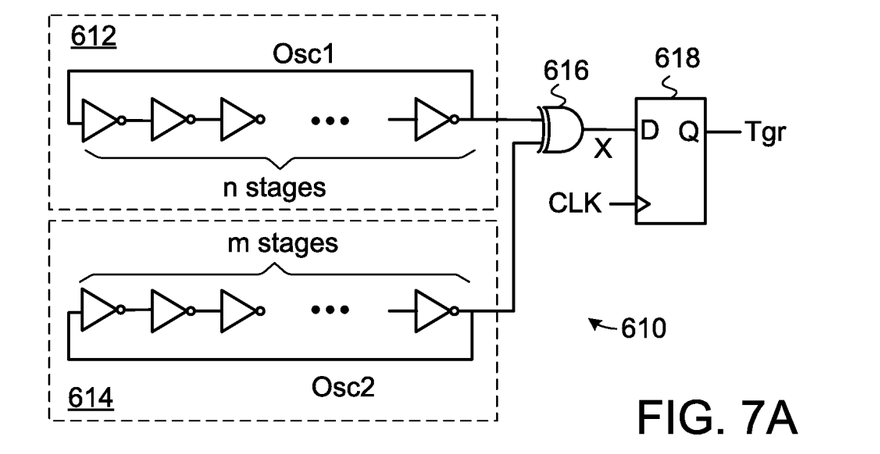
FIG. 7A is a schematic circuit block diagram illustrating the first dynamic entropy source used in the random number generator according to the third embodiment of the present invention.
Figure 7B:
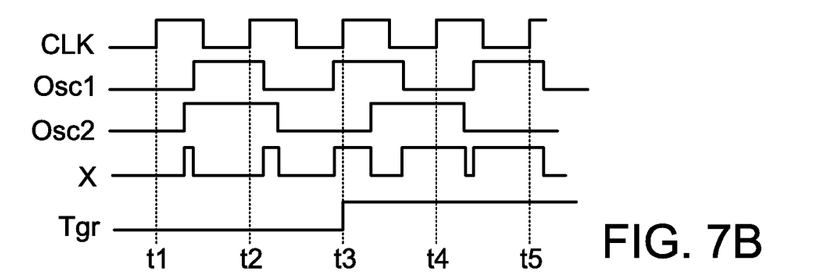
FIG. 7B is a schematic waveform diagram illustrating associated signals processed by the first dynamic entropy source as shown in FIG. 7A.

FIG. 7A is a schematic circuit block diagram illustrating the first dynamic entropy source used in the random number generator according to the third embodiment of the present invention. FIG. 7B is a schematic waveform diagram illustrating associated signals processed by the first dynamic entropy source as shown in FIG. 7A. The first dynamic entropy source 610 comprises a first ring oscillator 612, a second ring oscillator 614, an XOR gate 616 and a latch 618.

The first ring oscillator 612 comprises n stages of delay units in ring connection. The second ring oscillator 614 comprises m stages of delay units in ring connection. The delay units are NOT gates, wherein n and m are odd numbers and m is not equal to n. The first ring oscillator 612 generates a first oscillation signal Osc1. The second ring oscillator 614 generates a second oscillation signal Osc2.

The two input terminals of the XOR gate 616 receive the first oscillation signal Osc1 and the second oscillation signal Osc2, respectively. Moreover, an output signal X is outputted from an output terminal of the XOR gate 616 to the latch 618. According to a clock signal CLK, the latch 618 samples the output signal X from the XOR gate 616 and generates the triggering signal Tgr.

Please refer to FIG. 7B. Since m is not equal to n, the frequency of the first oscillation signal Osc1 and the frequency of the second oscillation signal Osc2 are different. In case that the first oscillation signal Osc1 and the second oscillation signal Osc2 are in the same level state, the output signal X from the XOR gate 616 is in the low logical level state. In case that the first oscillation signal Osc1 and the second oscillation signal Osc2 are in different level states, the output signal X from the XOR gate 616 is in the high logical level state. At the rising edges of the clock signal CLK corresponding to the time points t1 and t2, the latch 618 generates the triggering signal Tgr in the low logical level state. At the rising edges of the clock signal CLK corresponding to the time points t3, t4 and t5, the latch 618 generates the triggering signal Tgr in the high logical level state.

Figure 8A:
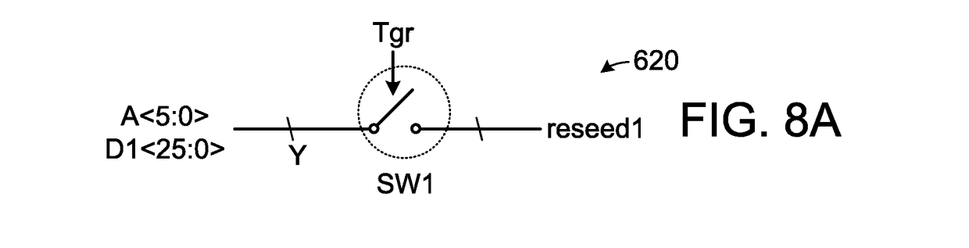
FIGS. 8A and 8B schematically illustrate two examples of the control circuit used in the random number generator according to the third embodiment of the present invention.
Figure 8B:
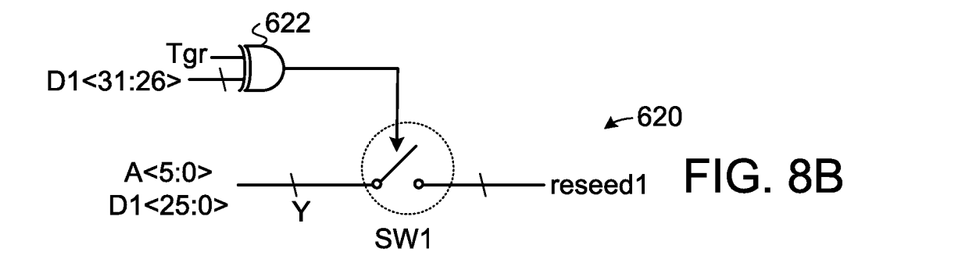

FIGS. 8A and 8B schematically illustrate two examples of the control circuit used in the random number generator according to the third embodiment of the present invention.

As shown in FIG. 8A, the control circuit 620 comprises a switching device SW1. A control terminal of the switching device SW1 receives the triggering signal Tgr. For example, the switching device SW1 is a transmission gate. Moreover, a portion of the address signal A and a portion of the first random number D1 are combined as a 32-bit combination signal Y, and the 32-bit combination signal Y is transmitted to a first terminal of the switching device SW1. A second terminal of the switching device SW1 generates the first reseed signal "reseed1".

In the example of FIG. 8A, 6 bits A<5:0> of the 7-bit address signal A and 26 bits D1<25:0> of the 32-bit first random number D1 are combined as the 32-bit combination signal Y. When the triggering signal Tgr is not activated (e.g., in the low logical level state), the first terminal and the second terminal of the switching device SW1 are in an open state. Meanwhile, the first reseed signal "reseed1" is not outputted from the switching device SW1. When the triggering signal Tgr is activated (e.g., in the high logical level state), the first terminal and the second terminal of the switching device SW1 are in a close state. Meanwhile, the first reseed signal "reseed1" is outputted from the switching device SW1.

It is noted that the relationships between the address signal A, the first random number D1 and the first reseed signal "reseed1" of the control circuit 620 are not restricted. It is noted that numerous modifications and alterations may be made while retaining the teachings of the invention. For example, in another embodiment, the control circuit 620 does not receive the address signal A and the first random number D1. When the triggering signal Tgr is activated, the control circuit 620 generates the 32-bit first reseed signal "reseed1". Alternatively, the second random number D2, the first random number D1, the address signal A and the output random number Dout are received by the control circuit 620, and combined as the 32-bit first reseed signal "reseed1".

As shown in FIG. 8B, a control terminal of the switching device SW1 is connected with an output terminal of an XOR gate 622. A first input terminal of the XOR gate 622 receives the triggering signal Tgr. A second input terminal of the XOR gate 622 receives another portion of the first random number D1. For example, the input terminals of the XOR gate 622 receive the triggering signal Tgr and the six bits D1<31:26> of the first random number D1. When the output terminal of an XOR gate 622 generates a low logical level, the first terminal and the second terminal of the switching device SW1 are in an open state. Meanwhile, the first reseed signal "reseed1" is not outputted from the switching device SW1. When the output terminal of an XOR gate 622 generates a high logical level, the first terminal and the second terminal of the switching device SW1 are in a close state. Meanwhile, the first reseed signal "reseed1" is outputted from the switching device SW1.

Before the random number generator 500 of the second embodiment and the random number generator 600 of the third embodiment are enabled, it is necessary to provide the first seed signal "seed1" to the first linear feedback shift register 520 and provide the second seed signal "seed2" to the second linear feedback shift register 505. If the first seed signal "seed1" and the second seed signal "seed2" are unpredictable, the random number generator generates the output data Dout with the better randomness.

Figure 9:
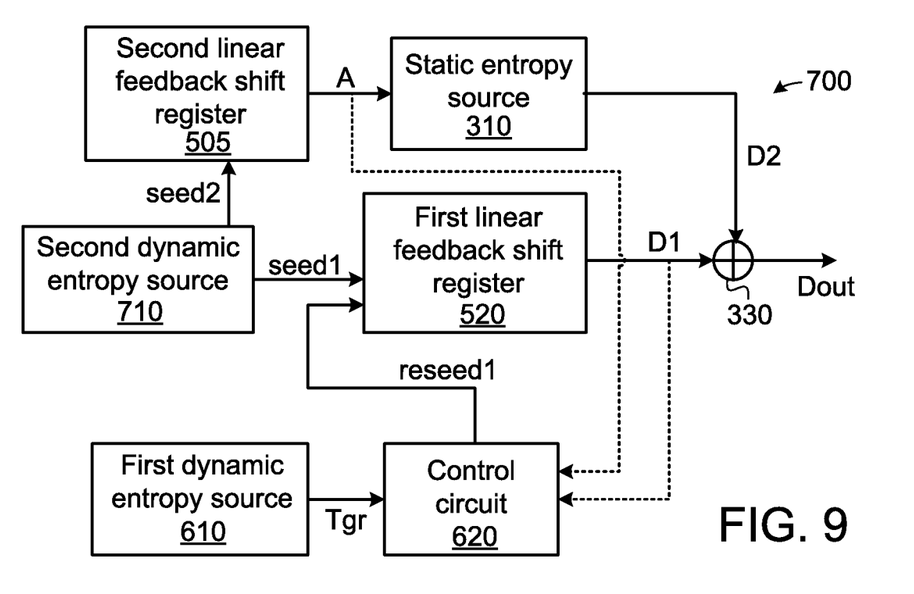
FIG. 9 is a schematic circuit block diagram illustrating the architecture of a random number generator according to a fourth embodiment of the present invention.

FIG. 9 is a schematic circuit block diagram illustrating the architecture of a random number generator according to a fourth embodiment of the present invention. In comparison with the third embodiment, the random number generator 700 of this embodiment further comprises a second dynamic entropy source 710. When the random number generator 700 is enabled, the second dynamic entropy source 710 provides the first seed signal "seed1" and the second seed signal "seed2" to the first linear feedback shift register 520 and the second linear feedback shift register 505, respectively. The first seed signal "seed1" and the second seed signal "seed2" are unpredictable. In this embodiment, the second dynamic entropy source 710 is a meta-stability circuit.

Figure 10A:
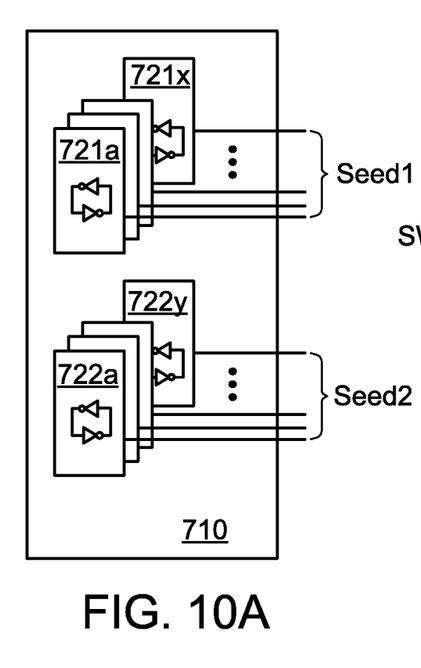
FIG. 10A schematically illustrates the architecture of the second dynamic entropy source used in the random number generator according to the fourth embodiment of the present invention.

FIG. 10A schematically illustrates the architecture of the second dynamic entropy source used in the random number generator according to the fourth embodiment of the present invention. The second dynamic entropy source 710 is a meta-stability circuit. The meta-stability circuit comprises plural meta-stability devices 721a~721x and 722a~722y, wherein x and y are positive integers. The structures of these meta-stability devices are identical. Each meta-stability device generates one-bit random signal. Consequently, the x meta-stability devices 721a~721x generate the x-bit first seed signal "seed1", and the y meta-stability devices 722a~722y generate the y-bit second seed signal "seed2". That is, 32 meta-stability devices generate the 32-bit first seed signal "seed1", and the 7 meta-stability devices generate the 7-bit second seed signal "seed2".

Figure 10B:
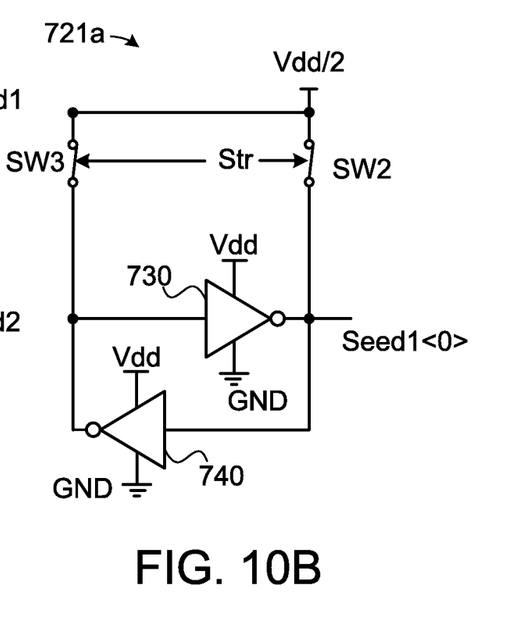
FIG. 10B schematically illustrates a meta-stability device of the second dynamic entropy source as shown in FIG. 10A.

FIG. 10B schematically illustrates a meta-stability device of the second dynamic entropy source as shown in FIG. 10A. For example, the meta-stability device 721a is shown. The meta-stability device 721a comprises a first inverter 730, a second inverter 740, a switching device SW2 and a switching device SW3. Each of the first inverter 730 and the second inverter 740 is operated between a supply voltage Vdd and a ground voltage GND. That is, the high logical level and the low logical level in each of the first inverter 730 and the second inverter 740 are equal to the supply voltage Vdd and the ground voltage GND, respectively.

The control terminal of the switching device SW2 and the control terminal of the switching device SW3 receive a start signal Str. According to the start signal Str, the switching device SW2 and the switching device SW3 selectively provide a half of the supply voltage Vdd (i.e., Vdd/2) to the input terminal of the first inverter 730 and the input terminal of the second inverter 740. The output terminal of the first inverter 730 is connected with the input terminal of the second inverter 740. The output terminal of the second inverter 740 is connected with the input terminal of the first inverter 730. The output terminal of the first inverter 730 generates the least significant bit (LSB) of the first seed signal "seed1<0>".

Before the random number generator 700 is enabled, the start signal Str is not activated. The switching device SW2 and the switching device SW3 are in the close state. The input terminal of the first inverter 730 and the input terminal of the second inverter 740 are fixed at Vdd/2. When the random number generator 700 is enabled, the start signal Str is activated. The switching device SW2 and the switching device SW3 are in the open state. Meanwhile, the first inverter 730 and the second inverter 740 start fighting. Consequently, the output terminal of one of the first inverter 730 and the second inverter 740 generates the high logical level, and the output terminal of the other of the first inverter 730 and the second inverter 740 generates the low logical level.

For example, if the output terminal of the second inverter 740 generates the low logical level and the output terminal of the other of the first inverter 730 generates the high logical level after the fighting action, the least significant bit (LSB) of the first seed signal "seed1<0>" is the high logical level. Whereas, For example, if the output terminal of the second inverter 740 generates the high logical level and the output terminal of the other of the first inverter 730 generates the low logical level after the fighting action, the least significant bit (LSB) of the first seed signal "seed1<0>" is the low logical level. Since the fighting result of the first inverter 730 and the second inverter 740 is unpredictable, the logical level of the least significant bit (LSB) of the first seed signal "seed1<0>" is unpredictable.

In other words, when the random number generator 700 is enabled, the second dynamic entropy source 710 provides the first seed signal "seed1" and the second seed signal "seed2" to the first linear feedback shift register 520 and the second linear feedback shift register 505, respectively. The first seed signal "seed1" and the second seed signal "seed2" are unpredictable.

The random number generator of the fourth embodiment may be further modified. Consequently, the randomness of the output random number Dout generated by the random number generator is further enhanced.

Figure 11:
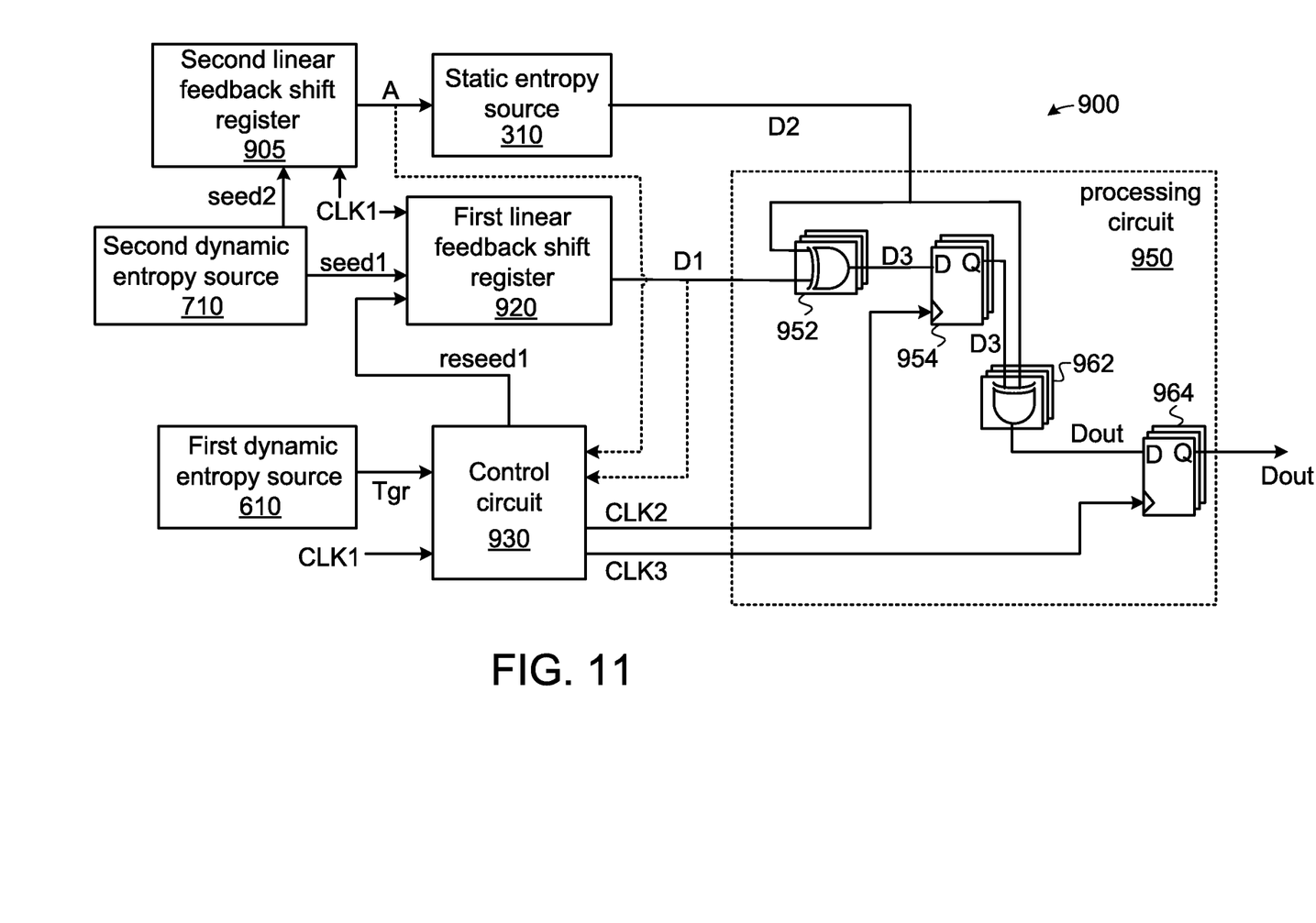
FIG. 11 is a schematic circuit block diagram illustrating the architecture of a random number generator according to a fifth embodiment of the present invention.

FIG. 11 is a schematic circuit block diagram illustrating the architecture of a random number generator according to a fifth embodiment of the present invention. As shown in FIG. 11, the random number generator 900 comprises a first linear feedback shift register 920, a second linear feedback shift register 905, a static entropy source 310, a processing circuit 950, a control circuit 930, a first dynamic entropy source 610 and a second dynamic entropy source 710. The first linear feedback shift register 920 may be considered as a counting value generator. The second linear feedback shift register 905 may be considered as an address generator. The static entropy source 310 is a PUF cell array. The PUF cell array comprises 128×32 PUF memory cells. After the enrollment on the PUF cell array is completed, the PUF cell array stores 4 k random bits. In addition, the PUF cell array is used as the static entropy source 310.

When the random number generator 900 is enabled, the second dynamic entropy source 710 provides the first seed signal "seed1" and the second seed signal "seed2" to the first linear feedback shift register 920 and the second linear feedback shift register 905, respectively. According to a first clock signal CLK1 and the second seed signal "seed2", the second linear feedback shift register 905 generates the address signal A to the static entropy source 310 continuously. Consequently, the static entropy source 310 generates the second random number D2 continuously. Similarly, according to the first clock signal CLK1 and the first seed signal "seed1", the first linear feedback shift register 920 generates the first random number D1 continuously.

During the operations of the random number generator 900, the first dynamic entropy source 610 generates the triggering signal Tgr to the control circuit 930. According to the triggering signal Tgr, the control circuit 920 selectively generates a first reseed signal "reseed1" to the first linear feedback shift register 920. Consequently, the first random number D1 is changed. Optionally, according to the triggering signal Tgr, the control circuit 930 generates a second reseed signal (not shown) to the second linear feedback shift register 905 to change the address signal A. Consequently, the second random number D2 is changed. Alternatively, the control circuit 930 combines a portion of the address signal A and a portion of the first random number D1 as the first reseed signal.

The processing circuit 950 comprises a first XOR circuit 952, a first latch circuit 954, a second XOR circuit 962 and a second latch circuit 964. A first input terminal of the first XOR circuit 952 is connected with the output terminal of the static entropy source 310. A second input terminal of the first XOR circuit 952 is connected with the output terminal of the first linear feedback shift register 920. An output terminal of the first XOR circuit 952 is connected with a data input terminal D of the first latch circuit 954. A clock input terminal of the first latch circuit 954 receives a second clock signal CLK2 from the control circuit 930. A first input terminal of the second XOR circuit 962 is connected with the output terminal of the static entropy source 310. A second input terminal of the second XOR circuit 962 is connected with an output terminal Q of the first latch circuit 954. An output terminal of the second XOR circuit 962 is connected with a data input terminal D of the second latch circuit 964. A clock input terminal of the second latch circuit 964 receives a third clock signal CLK3 from the control circuit 930. An output terminal of the second latch circuit 964 generates the output random number Dout.

In this embodiment, the first random number D1 and the second random number D2 in the previous status are inputted into the first XOR circuit 952. Consequently, the first XOR circuit 952 issues a third random number D3, and the third random number D3 is stored into the first latch circuit 954. Then, the first random number D1 and the third random number D3 in the next status are inputted into the second XOR circuit 962. Consequently, the second XOR circuit 962 generates the output random number Dout, and the output random number Dout is stored into the second latch circuit 964. Then, the output random number Dout is outputted from the second latch circuit 964.

Figure 12A:
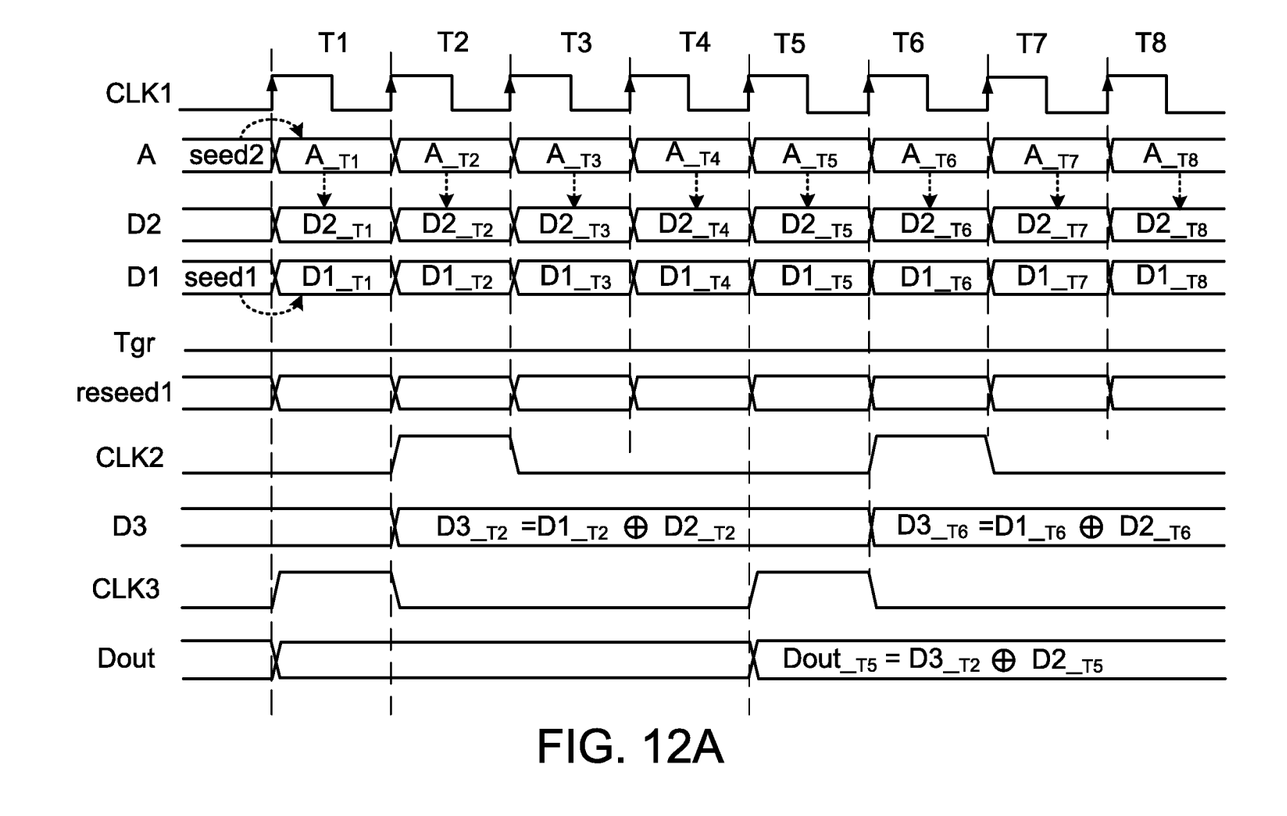
FIG. 12A is a schematic waveform diagram illustrating associated signals of the random number generator according to the fifth embodiment of the present invention, in which the triggering signal is not activated by the first dynamic entropy source.
Figure 12B:
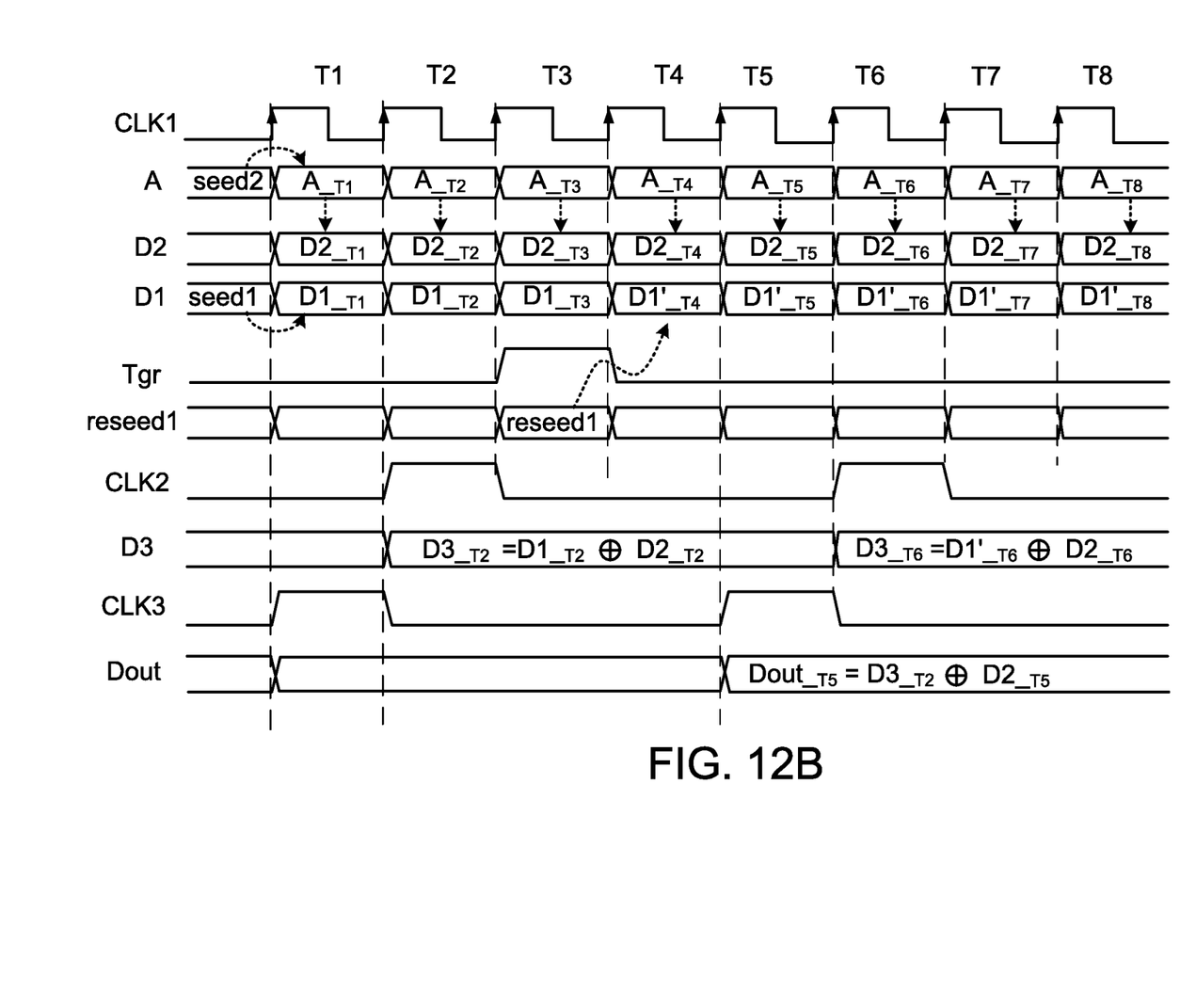
FIG. 12B is a schematic waveform diagram illustrating associated signals of the random number generator according to the fifth embodiment of the present invention, in which the triggering signal is activated by the first dynamic entropy source.

FIG. 12A is a schematic waveform diagram illustrating associated signals of the random number generator according to the fifth embodiment of the present invention, in which the triggering signal is not activated by the first dynamic entropy source. FIG. 12B is a schematic waveform diagram illustrating associated signals of the random number generator according to the fifth embodiment of the present invention, in which the triggering signal is activated by the first dynamic entropy source. The first clock signal CLK1 contains plural time periods.

Please refer to FIG. 12A. Firstly, the random number generator 900 is enabled. In the time period T1, the content $D1_{\_T1}$ of the first random number D1 is determined according to the first seed signal "seed1", and the content $A1_{\_T1}$ of the address signal A is determined according to the second seed signal "seed2". According to the content $A1_{\_T1}$ of the address signal A, the static entropy source 310 generates the content $D2_{\_T1}$ of the second random number D2.

In the subsequent time periods T2~T8, the first linear feedback shift register 920 generates different contents $D1_{\_T2}$~$D1_{\_T8}$ of the first random number D1, and the second linear feedback shift register 905 generates different contents $A_{\_T2}$~$A_{\_T8}$ of the address signal A. Consequently, the static entropy source 310 generates different contents $D2_{\_T2}$~$D2_{\_T8}$ of the second random number D2. Since the triggering signal Tgr is not activated by the first dynamic entropy source 610, the contents $D1_{\_T2}$~$D1_{\_T8}$ of the first random number D1 are not updated.

Moreover, in the time period T2, the second clock signal CLK2 is activated. After the first XOR circuit 952 performs the XOR operation on the content $D1_{\_T2}$ of the first random number D1 and the content $D2_{\_T2}$ of the second random number D2, the content $D3_{\_T2}$ of the third random number D3 is generated and stored into the first latch circuit 954.

Moreover, in the time period T5, the third clock signal CLK3 is activated. After the second XOR circuit 962 performs the XOR operation on the content $D3_{\_T2}$ of the third random number D3 and the content $D2_{\_T5}$ of the second random number D2, the generated content $Dout_{\_T5}$ is the output random number Dout and stored into the second latch circuit 964.

In the time period T6, the second clock signal CLK2 is activated. After the first XOR circuit 952 performs the XOR operation on the content $D1_{\_T6}$ of the first random number D1 and the content $D2_{\_T6}$ of the second random number D2, the content $D3_{\_T6}$ of the third random number D3 is generated and stored into the first latch circuit 954.

Please refer to FIG. 12B. In the time period T3, the triggering signal Tgr is activated. Consequently, a first reseed signal "reseed1" is loaded into the linear feedback shift register 920. Consequently, in the time period T4, the content $D1'_{\_T1}$ of the first random number D1 is determined according to the first reseed signal "reseed1". In the subsequent time periods T6~T8, the first linear feedback shift register 920 generates different contents $D1'_{\_T6}$~$D1'_{\_T8}$ of the first random number D1.

In the time period T2 and the time period T5, the operations of the processing circuit 950 are similar to those of FIG. 12A, and are not redundantly described herein.

Moreover, in the time period T6, the second clock signal CLK2 is activated. After the first XOR circuit 952 performs the XOR operation on the content $D1'_{\_T6}$ of the first random number D1 and the content $D2_{\_T6}$ of the second random number D2, the content $D3_{\_T6}$ of the third random number D3 is generated and stored into the first latch circuit 954. When the third clock signal CLK3 is activated, the output random number Dout different from FIG. 12A is outputted from the second latch circuit 964.

From the above descriptions, the present invention provides the random number generator. The PUF cell array comprising PUF memory cell is used as the static entropy source. The generated random number is disturbed by the processing circuit, the first dynamic entropy source and the second dynamic entropy source. Consequently, the random number generator is a true random number generator (TRNG) for generating the output random number Dout with better randomness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random number generator, comprising:
   a counting value generator for generating a first random number;
   an address generator for generating an address signal;
   a static entropy source connected with the address generator to receive the address signal and generate a second random number; and
   a processing circuit connected with the static entropy source and the counting value generator to receive the first random number and the second random number, wherein after the first random number and the second random number are processed by the processing circuit, the processing circuit generates an output random number.

2. The random number generator as claimed in claim 1, wherein the static entropy source comprises a PUF cell array, and the PUF cell array comprises plural PUF memory cells, wherein after an enrollment on the plural PUF memory cells is completed, the PUF cell array stores plural random bits.

3. The random number generator as claimed in claim 2, wherein the counting value generator is a first linear feedback shift register, and the address generator is a second linear feedback shift register, wherein the first linear feedback shift register receives a first seed signal, and the second linear feedback shift register receives a second seed signal.

4. The random number generator as claimed in claim 3, wherein the random number generator further comprises a control circuit and a first dynamic entropy source, and the first dynamic entropy source is connected with the control circuit, wherein when a triggering signal is activated by the first dynamic entropy source, the control circuit selectively generates a first reseed signal to the first linear feedback shift register.

5. The random number generator as claimed in claim 4, wherein the control circuit receives the address signal and the first random number and combines a first portion of the address signal and a first portion of the first random number as the first reseed signal, wherein when the triggering signal is activated by the first dynamic entropy source, the control circuit transmits the first reseed signal to the first linear feedback shift register.

6. The random number generator as claimed in claim 4, wherein the control circuit receives the address signal and the first random number and combines a first portion of the address signal and a first portion of the first random number as the first reseed signal, wherein after the control circuit performs a logical operation on the triggering signal and a second portion of the first random number, the control circuit selectively transmits the first reseed signal to the first linear feedback shift register.

7. The random number generator as claimed in claim 4, wherein when the triggering signal is activated by the first dynamic entropy source, the control circuit selectively generates a second reseed signal to the second linear feedback shift register.

8. The random number generator as claimed in claim 4, wherein the first dynamic entropy source comprises:
   a first ring oscillator comprising n stages of delay units in ring connection, and generating a first oscillation signal;
   a second ring oscillator comprising m stages of delay units in ring connection, and generating a second oscillation signal, wherein n and m are odd numbers and m is not equal to n;
   an XOR gate receiving the first oscillation signal and the second oscillation signal, and generating an output signal; and
   a latch receiving the output signal, wherein the output signal is latched by the latch according to a first clock signal, so that the triggering signal is generated.

9. The random number generator as claimed in claim 3, wherein the random number generator further comprises a second dynamic entropy source, and the second dynamic entropy source provides the first seed signal and the second seed signal to the first linear feedback shift register and the second linear feedback shift register, respectively.

10. The random number generator as claimed in claim 9, wherein the second dynamic entropy source is a meta-stability circuit, and the meta-stability circuit comprises:
    x meta-stability devices, wherein each of the x meta-stability devices generates one-bit random signal, wherein when a start signal is activated, the x meta-stability devices generate the first seed signal with x bits; and
    y meta-stability devices, wherein each of the y meta-stability devices generates one-bit random signal, wherein when the start signal is activated, the y meta-stability devices generate the second seed signal with y bits,
    wherein x and y are positive integers.

11. The random number generator as claimed in claim 10, wherein a first meta-stability device of the x meta-stability devices comprises:
    a first switching device, wherein a first terminal of the first switching device receives a first voltage, and a control terminal of the first switching device receives the start signal;
    a second switching device, wherein a first terminal of the second switching device receives the first voltage, and a control terminal of the second switching device receives the start signal;

a first inverter operated between a supply voltage and a ground voltage, wherein an input terminal of the first inverter is connected with a second terminal of the first switching device, and an output terminal of the first inverter is connected with a second terminal of the second switching device; and a second inverter operated between the supply voltage and the ground voltage, wherein an input terminal of the second inverter is connected with the second terminal of the second switching device, and an output terminal of the second inverter is connected with the second terminal of the first switching device, wherein the first voltage is equal to a half of the supply voltage, wherein when the start signal is not activated, the first switching device and the second switching device are in a close state, wherein when the start signal is activated, the first switching device and the second switching device are in an open state.

12. A random number generator, comprising:

a first dynamic entropy source for generating a triggering signal;

a second dynamic entropy source for generating a first seed signal and a second seed signal;

a counting value generator connected with the second dynamic entropy source to receive the first seed signal and generate a first random number;

an address generator connected with the second dynamic entropy source to receive the second seed signal and generate an address signal;

a static entropy source connected with the address generator to receive the address signal and generate a second random number;

a processing circuit connected with the static entropy source and the counting value generator to receive the first random number and the second random number, wherein after the first random number and the second random number are processed by the processing circuit, the processing circuit generates an output random number; and a control circuit connected with the first dynamic entropy source to receive the triggering signal, wherein when the triggering signal is activated, the control circuit selectively generates a first reseed signal to the counting value generator.

13. The random number generator as claimed in claim 12, wherein the static entropy source comprises a PUF cell array, and the PUF cell array comprises plural PUF memory cells, wherein after an enrollment on the plural PUF memory cells is completed, the PUF cell array stores plural random bits.

14. The random number generator as claimed in claim 13, wherein the counting value generator is a first linear feedback shift register, and the address generator is a second linear feedback shift register, wherein the first linear feedback shift register receives a first seed signal, and the second linear feedback shift register receives a second seed signal.

15. The random number generator as claimed in claim 14, wherein the control circuit receives the address signal and the first random number and combines a first portion of the address signal and a first portion of the first random number as the first reseed signal, wherein when the triggering signal is activated by the first dynamic entropy source, the control circuit transmits the first reseed signal to the first linear feedback shift register.

16. The random number generator as claimed in claim 14, wherein the control circuit receives the address signal and the first random number and combines a first portion of the address signal and a first portion of the first random number as the first reseed signal, wherein after the control circuit performs a logical operation on the triggering signal and a second portion of the first random number, the control circuit selectively transmits the first reseed signal to the first linear feedback shift register.

17. The random number generator as claimed in claim 12, wherein the first dynamic entropy source comprises:

a first ring oscillator comprising n stages of delay units in ring connection, and generating a first oscillation signal;

a second ring oscillator comprising m stages of delay units in ring connection, and generating a second oscillation signal, wherein n and m are odd numbers and m is not equal to n;

an XOR gate receiving the first oscillation signal and the second oscillation signal, and generating an output signal; and a latch receiving the output signal, wherein the output signal is latched by the latch according to a first clock signal, so that the triggering signal is generated.

18. The random number generator as claimed in claim 12, wherein the second dynamic entropy source is a meta-stability circuit, and the meta-stability circuit comprises:

x meta-stability devices, wherein each of the x meta-stability devices generates one-bit random signal, wherein when a start signal is activated, the x meta-stability devices generate the first seed signal with x bits; and y meta-stability devices, wherein each of the y meta-stability devices generates one-bit random signal, wherein when the start signal is activated, the y meta-stability devices generate the second seed signal with y bits, wherein x and y are positive integers.

19. The random number generator as claimed in claim 18, wherein a first meta-stability device of the x meta-stability devices comprises:

a first switching device, wherein a first terminal of the first switching device receives a first voltage, and a control terminal of the first switching device receives the start signal;

a second switching device, wherein a first terminal of the second switching device receives the first voltage, and a control terminal of the second switching device receives the start signal;

a first inverter operated between a supply voltage and a ground voltage, wherein an input terminal of the first inverter is connected with a second terminal of the first switching device, and an output terminal of the first inverter is connected with a second terminal of the second switching device; and a second inverter operated between the supply voltage and the ground voltage, wherein an input terminal of the second inverter is connected with the second terminal of the second switching device, and an output terminal of the second inverter is connected with the second terminal of the first switching device, wherein the first voltage is equal to a half of the supply voltage, wherein when the start signal is not activated, the first switching device and the second switching device are in a close state, wherein when the start signal is activated, the first switching device and the second switching device are in an open state.

20. The random number generator as claimed in claim 12, wherein the processing circuit comprises:

a first XOR circuit, wherein a first input terminal of the first XOR circuit is connected with the static entropy source to receive the second random number, and a second input terminal of the first XOR circuit is connected with the counting value generator to receive the first random number;

a first latch circuit, wherein a data input terminal of the first latch circuit is connected with an output terminal of the first XOR circuit, a clock input terminal of the first latch circuit receives a second clock signal from the control circuit, and a data output terminal of the first latch circuit generates a third random number;

a second XOR circuit, wherein a first input terminal of the second XOR circuit is connected with the static entropy source to receive the second random number, and a second input terminal of the second XOR circuit is connected with the data output terminal of the first latch circuit to receive the third random number; and a second latch circuit, wherein a data input terminal of the second latch circuit is connected with an output terminal of the second XOR circuit, a clock input terminal of the second latch circuit receives a third clock signal from the control circuit, and a data output terminal of the second latch circuit generates the output random number.

* * * * *